United States Patent [19]

Iwashita et al.

[11] Patent Number: 5,122,832
[45] Date of Patent: Jun. 16, 1992

[54] PRINTING CONTROL DEVICE

[75] Inventors: Tomonori Iwashita, Yokohama; Akira Egawa, Machida; Yoshiaki Sugiyama, Tokyo, all of Japan

[73] Assignee: Canon Kabushiki Kaisha, Tokyo, Japan

[21] Appl. No.: 730,625

[22] Filed: Jul. 16, 1991

Related U.S. Application Data

[63] Continuation of Ser. No. 347,871, May 5, 1989, abandoned.

[30] Foreign Application Priority Data

May 9, 1988 [JP] Japan .................. 63-113276

[51] Int. Cl.⁵ .................. G03B 17/24; G03B 27/52; G03B 27/70
[52] U.S. Cl. .................. 355/41; 354/106; 355/43; 355/66
[58] Field of Search .................. 354/75, 76, 105–109, 354/150; 355/40, 41, 43, 60, 61, 65, 66

[56] References Cited

U.S. PATENT DOCUMENTS

| | | | |
|---|---|---|---|
| 3,687,031 | 8/1972 | Jahnsman | 354/150 |
| 3,791,274 | 2/1974 | Hansen | 354/150 |
| 3,956,759 | 5/1976 | Karikawa | 354/150 |
| 4,390,270 | 6/1983 | Biedermann et al. | 355/46 |
| 4,583,831 | 4/1986 | Harvey | 354/106 |
| 4,659,213 | 4/1987 | Matsumoto | 355/40 |
| 4,717,930 | 1/1988 | Wheeler | 354/108 |
| 4,764,807 | 8/1988 | Kimura et al. | 355/43 |
| 4,780,735 | 10/1988 | Taniguchi et al. | 354/106 |

FOREIGN PATENT DOCUMENTS

| | | |
|---|---|---|
| 0052327 | 5/1982 | European Pat. Off. |
| 319719 | 9/1929 | United Kingdom |
| 314980 | 12/1930 | United Kingdom |
| 611622 | 11/1948 | United Kingdom |
| 1244371 | 9/1971 | United Kingdom |
| 1293723 | 10/1972 | United Kingdom |
| 1565051 | 4/1980 | United Kingdom |
| 2162957 | 2/1986 | United Kingdom |

Primary Examiner—L. T. Hix
Assistant Examiner—David M. Gray
Attorney, Agent, or Firm—Fitzpatrick, Cella, Harper & Scinto

[57] ABSTRACT

A reverse printing system is disclosed. A camera has a setting means for setting a reverse print informations and a recording means for recording the reverse print information set by the setting means. A printer has a reading means for reading the reverse print information recorded by the recording means and a control means for printing a photographed image so that the photographed image is reversely printed in accordance with the reverse print information.

5 Claims, 6 Drawing Sheets

PRINTING CONTROL DEVICE

This application is a continuation of application Ser. No. 07/347,871 filed May 5, 1989, now abandoned.

BACKGROUND OF THE INVENTION

1. Field of the Invention

The present invention relates to a printing control device of photographing medium, more practically, a printing control device of photographing medium suitable for a camera designed to be compact by, for example, constructing an optical axis of photographing lenses thereof parallel with a film surface.

2. Related Background Art

As a photographing optical system of a camera, heretofore, the optical axis of photographing lenses is, in general, normal to the film surface, and it is usual to locate the film surface in the vicinity of the focal point at the rear of the photographing lenses. In the case of 35 mm film cameras having such structure, if the focal length is, say, 50 mm, an open space of 50 mm length is necessary between the photographing lenses and the film surface. Accordingly, however small-sized the other mechanisms be made, the lens-barrel protrudes ahead. It has been considered, therefore, that it is difficult to make short the camera length along the optical axis beyond some extent. Furthermore, as to the dimension of camera height, compaction has been limited due to predetermined length of the film cartridge. Moreover, the transversal dimension of the camera is necessarily be decided by the film cartridge, the aperture and the winding spool. Thus, minimal dimensions along above-mentioned three directions has been limited, which has caused the restriction on the compaction. To solve these problems, a camera has been proposed, in which the photographing optical axis and the film surface are constructed to be parallel.

In such prior arts, however, the photographing optical axis needs to be deflected by a mirror to reach the film surface. Therefore, the left and right sides of the image are inverted, and when that film is printed in the same manner as a normal film, reversed photographs would be obtained. Then, an attempt has been made in which, for example, a penta roof prism has been set into the photographing optical system in order to obtain erecting images. Employing the penta roof prism, however, has a disadvantage that the prism prevents to lower the camera height and causes the cost up.

SUMMARY OF THE INVENTION

The present invention has been made under consideration of above-described circumstances. One aspect of the present invention is to propose a camera which comprises a setting means for setting a reverse print information and a recording means for recording the reverse print information so that a kind of small size camera the image of which has to be traversed is made for practical use without a complex photographing optical system for obtaining an erecting image.

Another aspect of the present invention is to propose a printing apparatus which is suitable for the small size camera the image of which has to be traversed, and which comprises a reading means for reading the traverse print information recorded by said recording means and a control means for printing the photographic image to be traversed.

Another aspect of the present invention will be apparent from the following description of the preferred embodiments.

DETAILED DESCRIPTION OF THE PREFERRED EMBODIMENTS

Figure 1:
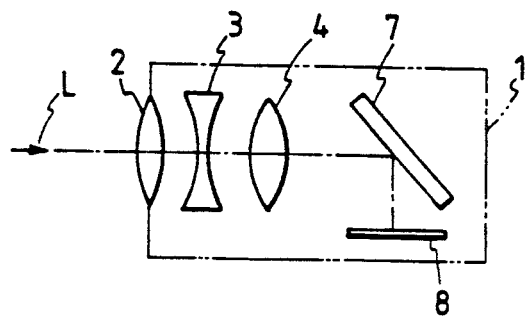
FIGS. 1 to 4 show explanatory drawings of one embodiment of a camera of the present invention, FIG. 2 being a schematic view of the camera, FIG. 1 being a side view seen along the arrow A in FIG. 2, FIG. 3 being a top view seen along the arrow B in FIG. 2, and FIG. 4 being a top view in which a part of FIG. 3 is enlarged.
Figure 2:
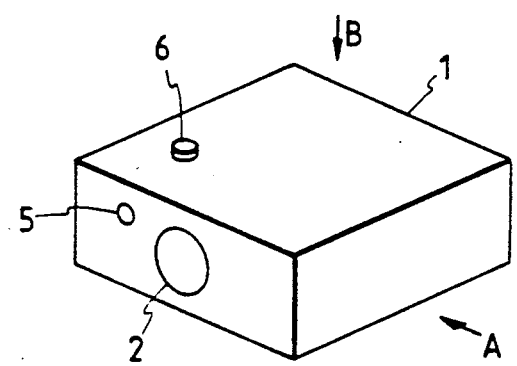
Figure 3:
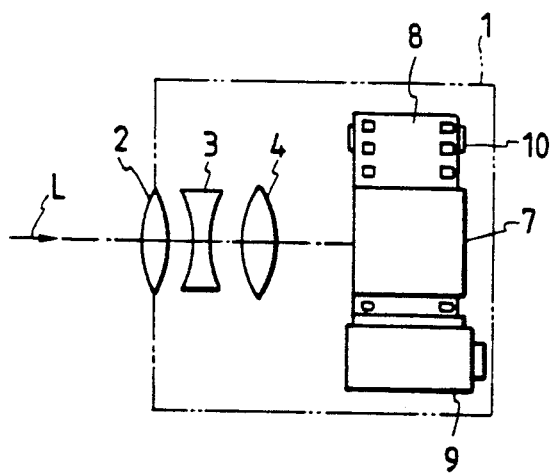
Figure 4:
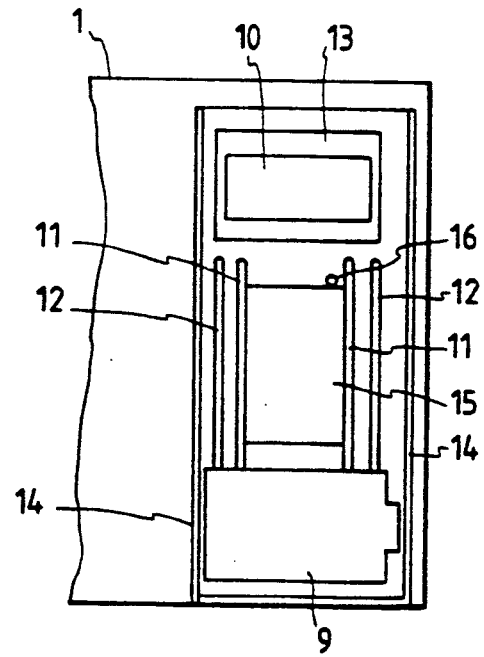

In the following, one embodiment of the present invention is described with reference to the drawings. FIGS. 1 to 4 are explanatory drawings of the camera, to which the present invention is applied. FIG. 2 is a schematic view, and FIG. 1 shows a side view seen along an arrow A in FIG. 2, which indicates an optical system alone. FIG. 3 shows a top view seen along an arrow B in FIG. 2, and FIG. 4 is a top view in which a part of FIG. 3 is enlarged.

In these drawings, numeral 1 denotes a camera body, numeral 2 denotes an objective lens. The objective lens 2, together with other lenses 3 and 4, forms a photographing lens group. Numeral 5 denotes a finder, numeral 6 denotes a shutter release button, numeral 7 denotes an optical means, such as a mirror, to deflect downwards a photographing optical axis L in FIG. 1. Numeral 8 denotes a film arranged below the optical means 7, numeral 9 denotes a film cartridge, and numeral 10 denotes a spool for winding the film. For easy understandings, FIG. 4 indicates a situation, in which the film 8 is set in the film cartridge 9, and a rear lid (not shown) is removed. In the FIG. 4, numeral 11 denotes an inside rail that regulates the film position along the optical axis, numeral 12 denotes an outside rail that regulates the film position along the transversal direction of the film, numeral 13 denotes a spool chamber, and numeral 14 denotes a groove, with which the rear lid (not shown) engages to intercept the ambient light. Numeral 15 denotes an aperture, numeral 16 denotes a light emitting member installed near the aperture 15. For the light emitting member 16, a light emitting diode might be used.

Figure 5:
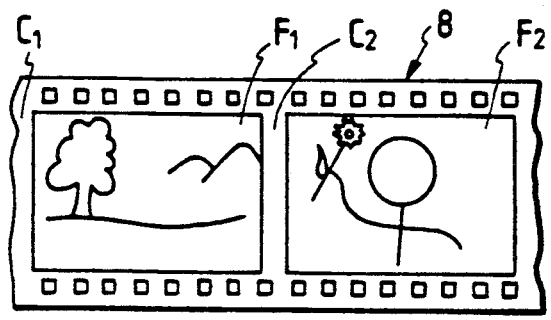
FIG. 5 shows a top view of a film employed in the embodiment of the present invention.

In the following, there are described operations to photograph using the camera composed as above. When photographing is carried out by depression of the shutter release button 6, the light emitting member 16 is turned on for a moment through a circuit (described below). Then, as indicated in FIG. 5, a small part on the film 8 facing the light emitting member 16 is exposed, and a code $C_1$ is imprinted on the film 8.

Thus, on the left-side of exposed frames $F_1$, $F_2$, corresponding codes $C_1$, $C_2$ are imprinted, respectively.

Figure 8:
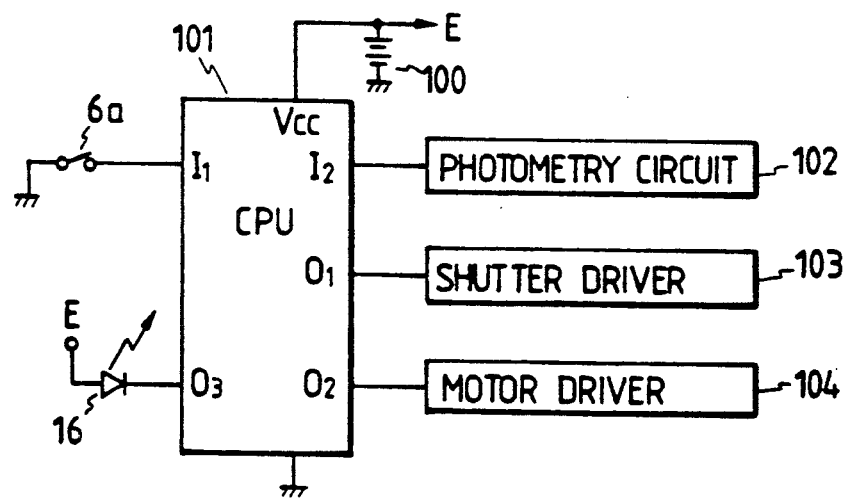
FIG. 8 shows a circuit diagram of the camera of FIG. 1.

FIG. 8 shows an electric circuit diagram of the camera of FIG. 1. In FIG. 8, numeral 100 denotes a battery, by which a power E is supplied. Numeral 101 denotes a CPU which controls the camera, numeral 102 denotes a photometry circuit by which the object luminance is measured and photometric informations are supplied, numeral 103 denotes a shutter driver which controls the exposure onto the film surface, numeral 104 denotes a motor driver which winds or rewinds the film, numeral 16 denotes the light emitting member described before, and 6a denotes a shutter release switch which is linked to the shutter release button 6.

Figure 9:
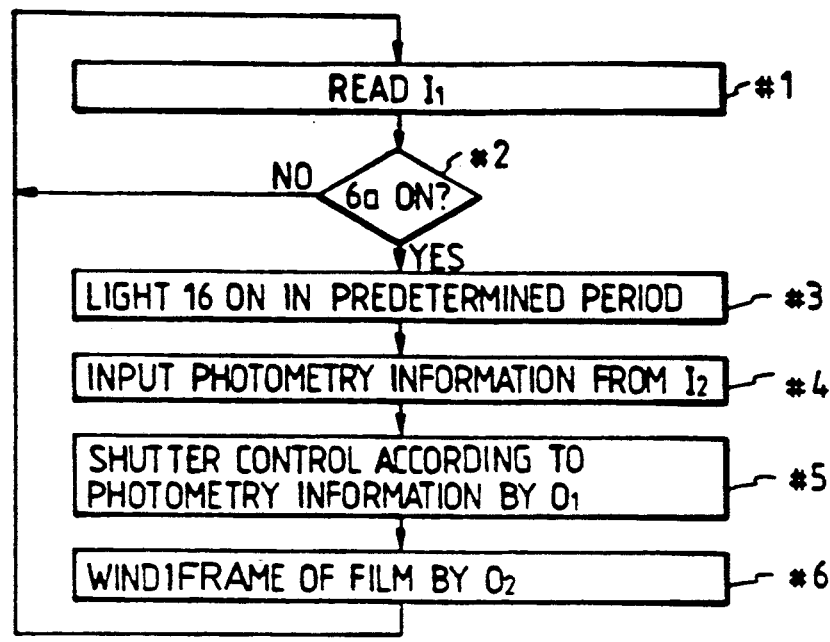
FIG. 9 shows a flow chart indicating operations of the circuit of FIG. 8.

Operations of the electric circuit shown in FIG. 8 are now explained according to FIG. 9, which shows a flow chart indicating operations of the CPU 101. At step #1 informations on the condition of the shutter release switch 6a is supplied through an input terminal $I_1$. At a step #2, it is judged if the shutter release button 6a is on or off. In the case that the shutter release switch 6a is off, the operation returns back to the step #1, and in the case of the switch 6a is on, then the exposure starts at a step #3. At the step #3, as stated before, the light emitting member 16 is let lighted for a predetermined time interval through an output terminal $O_3$ to record the codes $C_1$ and $C_2$. At a step #4, the photometric informations on the object luminance are received through an input terminal $I_2$. According to the information, at a step #5, the shutter driver 103 is controlled through an output terminal $O_1$ so as to obtain adequate exposure. At a step #6, through an output terminal $O_2$, a controlling signal is transmitted to the motor driver 104 so as to wind the film by one frame, then the operation returns to the step #1.

In the above construction, informations are imprinted by the light emitting member. Without confining to the optical record, however, other recording mediums such as magnetic memories or semiconductor memories, are available. This can be done by arranging relevant interface for each medium at the output terminal $O_3$ in FIG. 8.

Figure 10:
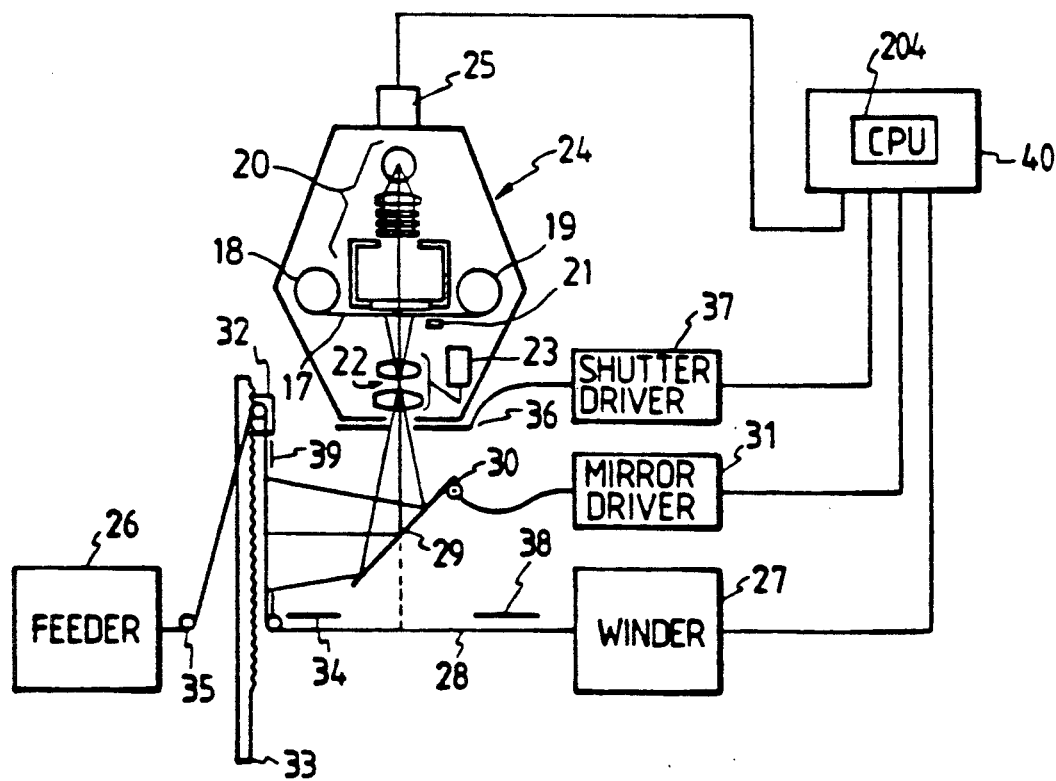
FIG. 10 shows an explanatory drawing of one embodiment of an automatic photograph printing device of the present invention.

FIG. 10 is an explanatory drawing of one embodiment of an automatic photograph printing device suitable for the camera of FIG. 1. In FIG. 10, numeral 17 is a negative film, which is supplied from a film supply member 18 and is wound up around a film winding member 19. Between these members is installed a light source 20 comprising a lamp, condenser lenses, diffusion plate and a mixing box. Below the negative film, an information reading member 21, zoom lenses 22 for printing, and a zoom motor 23 for driving the zoom lenses 22 are arranged. The information reading member 21 has a sensor to read the code $C_1$ or $C_2$ stated before. All of the negative film 17, the film supply member 18, the film winding member 19, the light source 20, the information reading member 21, zoom lenses 22 for printing and the zoom motor 23 are brought into a housing to form a head portion 24 of the automatic photograph printing device. The head portion 24 is rotatably attached to an unshown body of the printing device. Numeral 25 dentoes a rotating motor for the head portion 24, and permits the head portion 24 to rotate by 90° from a usual position. Below the zoom lenses 22, a printing paper supply member 26 and a printing paper winding member 27 are arranged, and a printing paper 28 is supplied from the printing paper supply member 26 and is wound round printing paper winding member 27. Between the zoom lens 22 and the printing paper 28, a mirror 29 which is supported by a rotatable shaft 30 permitting the mirror 29 to rotate is installed. Numeral 31 is a mirror driving circuit which rotates the mirror 29 from the vertical position to the tilted position by 45° as shown in FIG. 10. Numeral 32 is a movable roller movable along a guide rail 33. Numerals 34 and 35 are rollers rotatably supported by unshown members. In front of the zoom lenses 22, a shutter 36 and a shutter driver 37 are arranged, the former controlling the exposure to the print, the latter being the driving circuit for the shutter driver 37. Furthermore, close to the printing paper 28, masking members 38 and 39 are set to screen the part of printing paper 28 which need not be exposed to the light. And besides, numeral 40 is a controlling part to control above constructions, having CPU 204.

Figure 6:
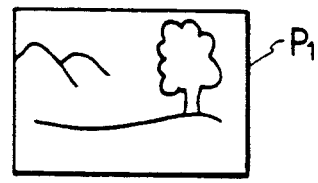
FIGS. 6 and 7 show top views of prints corresponding to frames $F_1$ and $F_2$ in FIG. 5.
Figure 7:
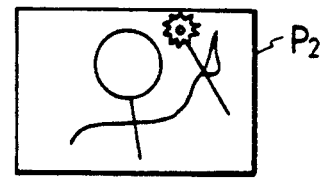

In the following, operations of the automatic photograph printing device of FIG. 10 are explained. First, the negative film 17 is moved from the film supply member 18 to the film winding member 19. When a frame edge detector (described below) detects an edge (not shown) of the negative film 17, the negative film 17 comes to stop at a proper position. Then, the sensor of the information reading member 21 detect the presence of the codes $C_1$ and $C_2$. For frames on which any code is not recorded, ordinary printing is carried out, keeping the mirror 29 away from the vicinity of the optical path. For frames (for example, frames $F_1$ or $F_2$ of FIG. 5) on which codes are recorded, reverse printing is carried out by keeping the mirror 29 tilted by 45° on the optical path. When codes are recorded on all frames, by setting the negative film 17 turned over between the film supply member 18 and the film winding member 19, reverse printing could be done. Thus, as shown in FIGS. 6 and 7, correct prints $P_1$ and $P_2$, in which the left and right sides of the image are not inverted, are obtained from the frames $F_1$ and $F_2$, respectively.

Figure 11:
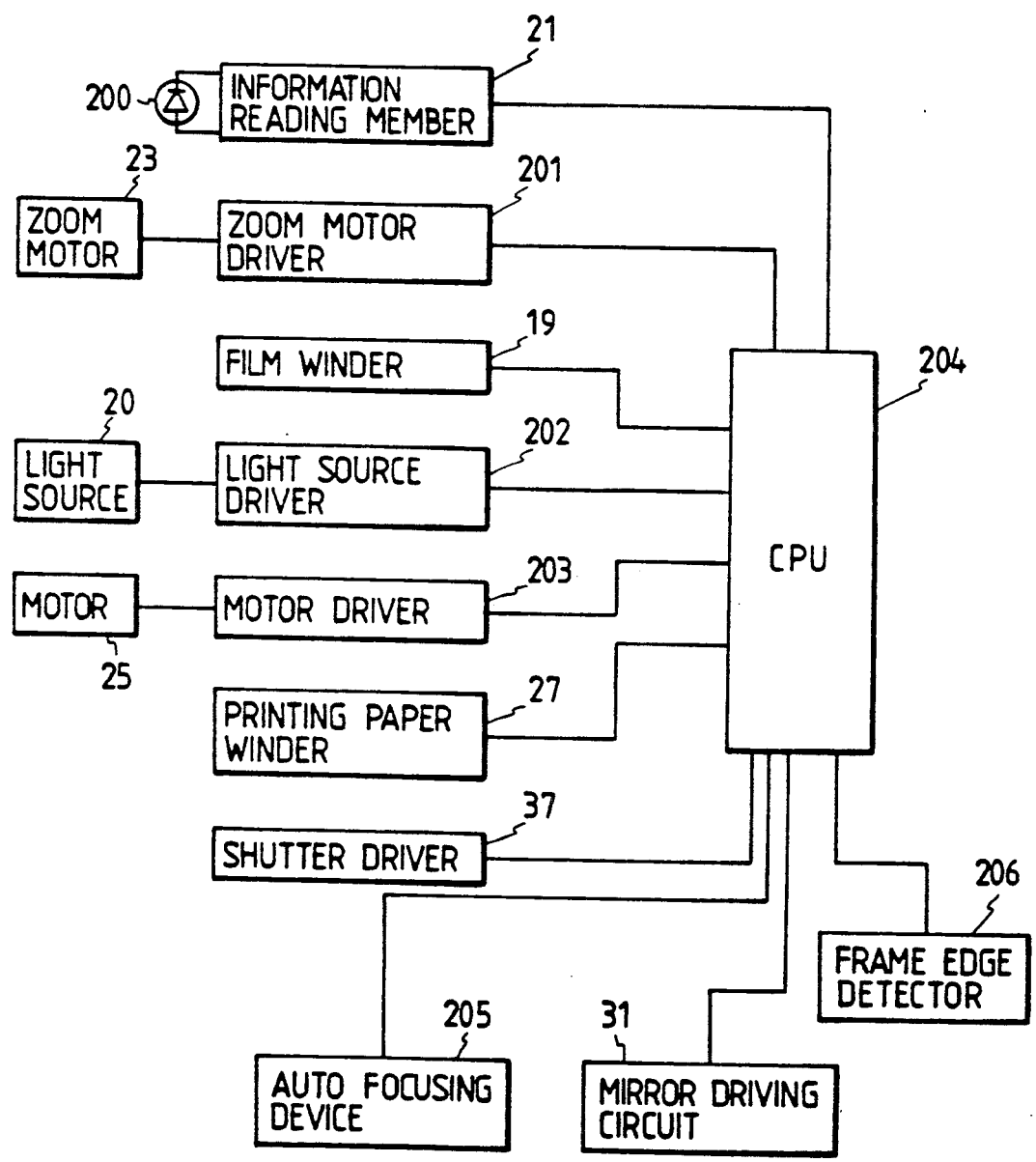
FIG. 11 shows a circuit diagram of the printing device of FIG. 10.

FIG. 11 shows a circuit diagram of the printing device of FIG. 10. In FIG. 11, numeral 21, being the aforementioned information reading member, detects the presence of the code on the film surface by a sensor 200, and transmits the information to the CPU 204. Numeral 201 is a zoom motor driver which drives the zoom motor 23 so as to let the print size desirable Numeral 19 is the film winding member to set the film at a proper position This is controlled by the CPU 204. Numeral 202 denotes a light source driver that controls the light source 20 and a color filter (not shown). Numeral 203 is a rotation motor driver to control the rotating motor 25. Numeral 27 is the printing paper winding member to wind the exposed print by predetermined amount for the next exposure Numeral 37 is the aforementioned shutter driver to control the shutter 36 which controls the exposure during printing.

Numeral 205 denotes an auto-focusing device to focus automatically, numeral 31 is the mirror driving circuit to, in the case of reverse printing, obtain non-inverted prints by switching the optical path by the mirror 29, and numeral 206 denotes the frame edge detector as described before.

In the following, the operations of the printing device of FIG. 11 is explained according to the flow chart of FIG. 12.

Figure 12:
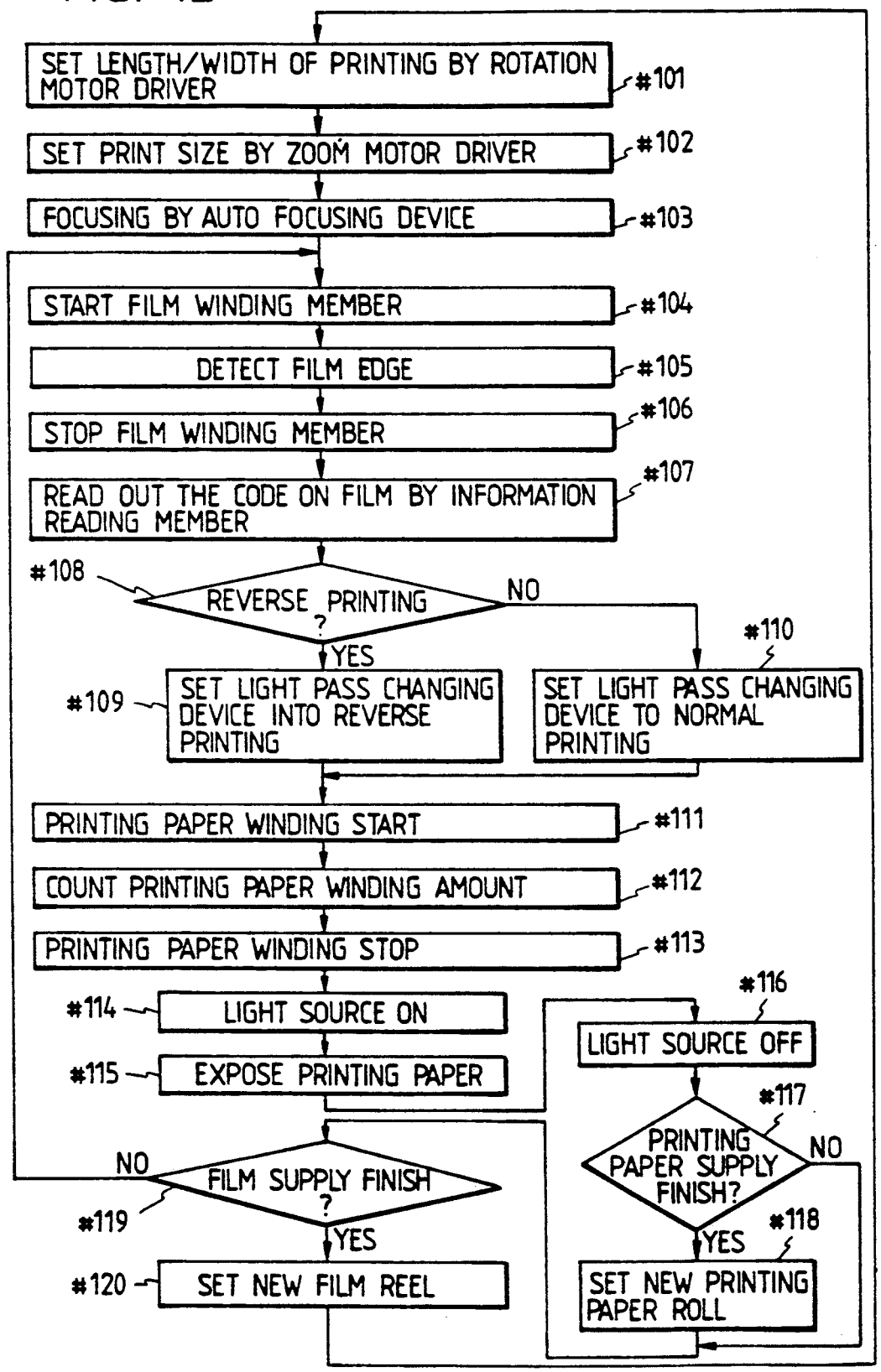
FIG. 12 shows a flow chart indicating operation of the circuit of FIG. 11.

In FIGS. 11 and 12, in order to print the image of the negative film 17 onto the printing paper 28, the reel of negative film 17 is set in the film supply member 18 and the roll of printing paper 28 is set in the printing paper supply member 26. After that, at a step #101, according to indication on the size of the print, and taking the size of the printing paper 28 into account, the length/width of printing is set by the rotation motor driver 203. Then, at a step #102, the zoom lens 22 is controlled by the zoom motor driver 201 so that the film image on the printing paper 28 could be of predetermined size. At a step #103, the image on the printing paper 28 is focused by the autofocusing device. For such focusing means, either autofocusing device arranged in the vicinity of the zoom lenses 22 or a member to control the height of the head portion 24 is available. At a step #104, the film winding member 19 is started, and at a step #105, the frame of the film is located at a correct position on detecting the edge of the frame by the frame edge detector 206, then, at a step #106, the film winding member is stopped. At a step #107, the codes ($C_1$, $C_2$ in FIG. 5) on the film is read out by the information reading member 21. When the code is present at a step #108, the operation proceeds to a step #109 to print in reverse, and when the code is absent, the normal printing is carried out and the operation proceeds to a step #110, where the light path is switched. At a step #111, the printing paper winding member 27 is started. After counting the winding amount of the printing paper at a step #112, the printing paper winding member 27 is stopped and the printing paper 28 is set at a step #113. At a step 114, the light source is turned on by the light source driver 202, followed by the exposure for a preset time interval, at a step #115, controlled by the shutter driver 37 so that the correct exposure could be done. In the above, one exposure run is described. In the case of color photographs, the same procedures are repeated with changing the filters, but the explanations are omitted here. At a step #116, the light source 20 is turned off, and at a step #117, it is checked up whether the printing paper in the printing paper supply member 26 remains or not. When the printing paper does not remain, a new printing paper roll is set, and when the printing paper remains, the operation proceeds to a step #119, where it is checked up whether the film remains in the film supply member 18 or not. When the film remains, the operation returns to #104 and the printing is iterated. When the film is used up, the reel of a new film is set in the film supply member 18 at a step #120, and then the operation returns to the step #101, on which &he iteration of the printing follows.

Figure 13:
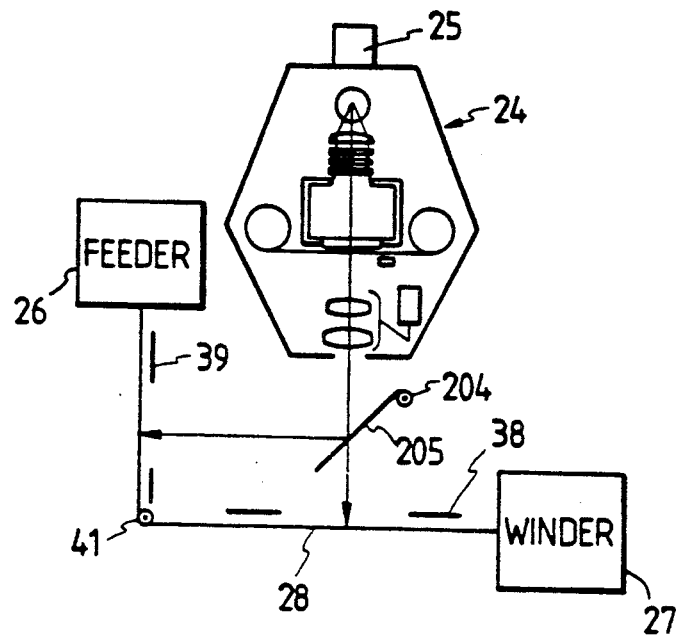
FIGS. 13, 14A and 14B other embodiment of the printing device of FIG. 10.

FIG. 13 shows another embodiment of the printing device of FIG. 10, where the movable roller is removed, but a converting roller is newly installed to convert the direction of the motion of the printing paper Since other constructions and operations of FIG. 13 are the same as those of FIGS. 11 and 12, explanations of them are omitted.

Figure 14A:
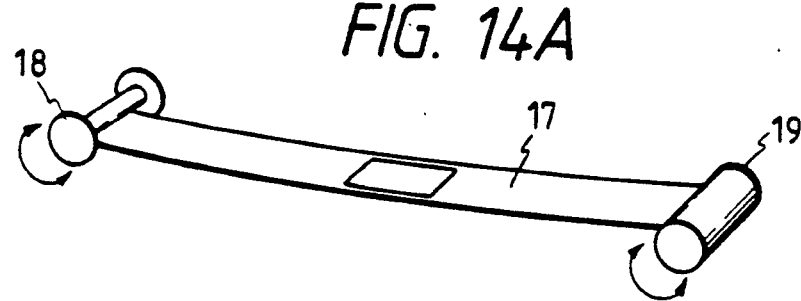
Figure 14B:
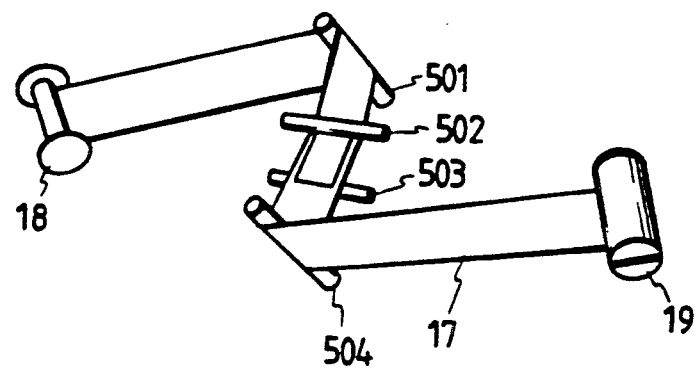

FIG. 14 shows another example of the printing device to reverse the image. As shown in FIG. 14A, the film supply member 18 and the film winding member 19 are so supported by members (not shown) as to be rotatable on the same plane. As can be seen in FIG. 14B, during reverse rotation, rollers 501 to 504 let the negative film 17 reversed and make reverse printing possible.

In above explanations, in the case when reverse printing is needed for all frames of the film, since the positions of the codes can be made upside down by setting the frames in the same order the sensor does not decide it reversed, thus, the film could be set in that condition.

Note that, in the printing device according to FIGS. 10, 13 and 14, for cutting the printing paper after completion of the printing process, it would be possible to automatically cut the printing paper after the fixing process on the basis of a previously memorized cutting interval information.

Further, in accordance with above-described embodiments, the reverse printing code was imprinted to the film by the illumination of the light emitting diode. However, it may also be possible to make a punch-hole on the film, to attach a light reflection paper or the like onto the film surface, or to use a magnetic recording medium. Furthermore, instead of recording the information onto the film surface, for example, it may be possible to memorize the information to the magnetic recording medium or the non-volatile memory, PROM, EPROM, EEPROM or the like, and to arrange it as a part of the film cartridge or an attachable card.

It should be noted that the recording to above-mentioned medium is possible by providing appropriate. interface to the output terminal $O_3$.

It also should be noted that, in the embodiments described above, description has been made for a camera using a film. However, it is apparent that the present invention is applicable for a camera using a magnetic recording medium, e.g. video camera and the like, or other types of camera using various kinds of image recording medium.

What is claimed is:

1. A print control system for a camera, comprising:
   a camera having a recording means for recording a reverse print information which indicates that a photographic image is to be reversely printed; and
   a printer having (a) a reading means for reading the reverse print information recorded by said recording means and (b) control means for printing the photographed image so that the photographed image is reversely printed in accordance with the reverse print information read by said reading means.

2. A system according to claim 1, wherein said recording means comprises means for recording the reverse print information on a photographic film.

3. A system according to claim 1, wherein said recording means comprises means for imprinting the reverse print information onto a photographic film surface.

4. A system according to claim 1, wherein said recording means comprises means for imprinting the reverse print information to an area outside a photographic film frame, within which the photographic image is to be recorded.

5. A system according to claim 1, wherein said recording means comprises means for recording the reverse print information to an area outside a film frame, within which the photographic image is to be recorded.

* * * * *

UNITED STATES PATENT AND TRADEMARK OFFICE
CERTIFICATE OF CORRECTION

PATENT NO. : 5,122,832

DATED : June 16, 1992

INVENTOR(S) : TOMONORI IWASHITA, ET AL.

It is certified that error appears in the above-identified patent and that said Letters Patent is hereby corrected as shown below:

Column 3:

Line 12, "informations are" should read --information is--.

Line 22, " informations" should read --information--.

Line 32, "informations" should read --information--.

Line 40, "informations are" should read --information--.

Column 4:

Line 29, "detect" should read --detects--.

Line 49, "desirable" should read --desirable.--

Line 51, "position" should read --position.--

UNITED STATES PATENT AND TRADEMARK OFFICE
CERTIFICATE OF CORRECTION

PATENT NO. : 5,122,832
DATED : June 16, 1992
INVENTOR(S) : TOMONORI IWASHITA, ET AL.

Page 2 of 2

It is certified that error appears in the above-identified patent and that said Letters Patent is hereby corrected as shown below:

Column 5:

Line 51, "&he" should read --the--.

Line 56, "paper" should read --paper.--

Column 6:

Line 6, "order" should read --order,--

Signed and Sealed this

Third Day of August, 1993

Attest:

MICHAEL K. KIRK

Attesting Officer

Acting Commissioner of Patents and Trademarks